US008060877B1

(12) United States Patent
Waldspurger et al.

(10) Patent No.: US 8,060,877 B1
(45) Date of Patent: *Nov. 15, 2011

(54) UNDEFEATABLE TRANSFORMATION FOR VIRTUAL MACHINE I/O OPERATIONS

(75) Inventors: Carl A. Waldspurger, Atherton, CA (US); Edouard Bugnion, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1121 days.

This patent is subject to a terminal disclaimer.

(21) Appl. No.: 11/841,622

(22) Filed: Aug. 20, 2007

Related U.S. Application Data

(63) Continuation of application No. 09/844,581, filed on Apr. 26, 2001, now Pat. No. 7,260,820.

(51) Int. Cl.
*G06F 9/455* (2006.01)
*G06F 21/00* (2006.01)
*G06F 11/30* (2006.01)
*G06F 17/00* (2006.01)

(52) U.S. Cl. ............ 718/1; 711/6; 713/187; 713/188; 713/189; 726/1

(58) Field of Classification Search .......... 718/1
See application file for complete search history.

(56) References Cited

U.S. PATENT DOCUMENTS

| 4,172,213 A | 10/1979 | Barnes et al. |
| 4,918,653 A | 4/1990 | Johri et al. |
| 4,937,861 A | 6/1990 | Cummins |
| 5,224,166 A | 6/1993 | Hartman |
| 5,450,595 A | 9/1995 | Chen et al. |
| 5,606,613 A | 2/1997 | Lee et al. |
| 5,666,516 A | 9/1997 | Combs |
| 5,784,459 A | 7/1998 | Devarakonda et al. |
| 5,987,440 A * | 11/1999 | O'Neil et al. ............ 705/44 |
| 5,995,623 A | 11/1999 | Kawano et al. |
| 6,070,245 A | 5/2000 | Murphy et al. |
| 6,071,317 A * | 6/2000 | Nagel ............... 717/128 |
| 6,370,619 B1 | 4/2002 | Ho et al. |
| 6,374,266 B1 | 4/2002 | Shnelvar |
| 6,470,423 B1 | 10/2002 | Ho et al. |
| 6,584,612 B1 * | 6/2003 | Mueller et al. ........ 717/166 |
| 6,587,945 B1 * | 7/2003 | Pasieka ............ 713/176 |
| 6,804,819 B1 | 10/2004 | Bates et al. |
| 6,922,774 B2 | 7/2005 | Meushaw et al. |
| 6,931,531 B1 | 8/2005 | Takahashi |
| 6,971,018 B1 | 11/2005 | Witt et al. |

(Continued)

OTHER PUBLICATIONS

Lie et al., "Architectural Support for Copy and Tamper Resistant Software", Computer Systems Laboratory, Stanford University, ACM, pp. 168-177 (2000).

*Primary Examiner* — Jennifer To
(74) *Attorney, Agent, or Firm* — Jeffrey Pearce

(57) ABSTRACT

I/O operations between a virtual machine (VM) and a device external to the VM are monitored by a virtual machine monitor (VMM). Data passing between the VM and the external device is transformed by the VMM, in some cases only when a predetermined filtering or triggering condition is met. Because the VMM, and thus the transformation operation, is transparent to the VM, the transformation cannot be prevented or undone or even affected by any action by a user of the VM. Examples of the non-defeatable transformation of I/O data include generating display overlays such as banners, masking out portions of a display, encryption, compression and network shaping such as bandwidth limiting.

32 Claims, 3 Drawing Sheets

U.S. PATENT DOCUMENTS

| | | | |
|---|---|---|---|
| 6,986,043 B2 | 1/2006 | Andrew et al. | |
| 7,010,655 B1 | 3/2006 | Harmer et al. | |
| 7,024,555 B2 * | 4/2006 | Kozuch et al. | 726/22 |
| 7,035,963 B2 * | 4/2006 | Neiger et al. | 711/6 |
| 7,149,901 B2 | 12/2006 | Herbert et al. | |
| 7,152,165 B1 | 12/2006 | Maheshwari et al. | |
| 7,260,820 B1 | 8/2007 | Waldspurger et al. | |
| 7,428,636 B1 | 9/2008 | Waldspurger et al. | |
| 7,818,808 B1 * | 10/2010 | Neiger et al. | 726/26 |
| 7,890,754 B2 | 2/2011 | Waldspurger et al. | |
| 2001/0018736 A1 | 8/2001 | Hashimoto et al. | |
| 2002/0032691 A1 | 3/2002 | Rabii et al. | |
| 2002/0065924 A1 | 5/2002 | Barrall et al. | |
| 2002/0066038 A1 | 5/2002 | Mattsson et al. | |
| 2002/0069241 A1 * | 6/2002 | Narlikar et al. | 709/203 |
| 2002/0069323 A1 | 6/2002 | Percival | |
| 2002/0073276 A1 | 6/2002 | Howard et al. | |
| 2002/0078049 A1 * | 6/2002 | Samar | 707/9 |
| 2002/0087883 A1 | 7/2002 | Wohlgemuth et al. | |
| 2002/0143842 A1 * | 10/2002 | Cota-Robles et al. | 709/1 |
| 2002/0161908 A1 | 10/2002 | Benitez et al. | |
| 2002/0169987 A1 | 11/2002 | Meushaw et al. | |
| 2002/0178176 A1 | 11/2002 | Sekiguchi et al. | |
| 2003/0009538 A1 | 1/2003 | Shah et al. | |
| 2004/0153642 A1 | 8/2004 | Plotkin et al. | |
| 2005/0033966 A1 * | 2/2005 | Johnson, Jr. | 713/176 |
| 2005/0044364 A1 * | 2/2005 | Johnson, Jr. | 713/170 |
| 2006/0015718 A1 | 1/2006 | Liu et al. | |
| 2006/0123250 A1 | 6/2006 | Maheshwari et al. | |
| 2006/0136735 A1 | 6/2006 | Plotkin et al. | |
| 2008/0072071 A1 | 3/2008 | Forehand et al. | |
| 2008/0313128 A1 | 12/2008 | Arasu et al. | |

* cited by examiner

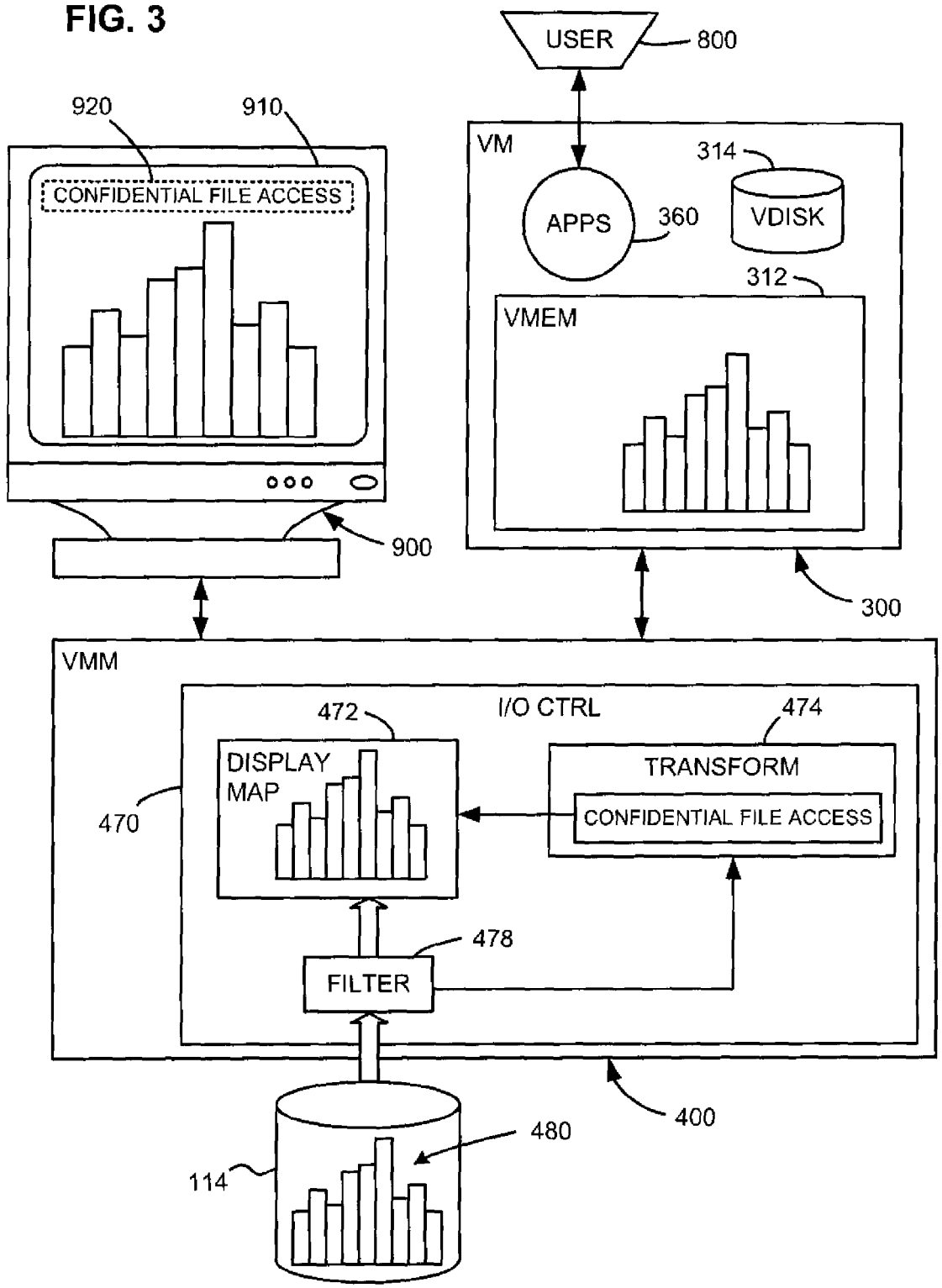

UNDEFEATABLE TRANSFORMATION FOR VIRTUAL MACHINE I/O OPERATIONS

CROSS REFERENCE TO RELATED APPLICATIONS

This application is a continuation of, and claims priority to, U.S. patent application Ser. No. 09/844,581, filed on Apr. 26, 2001 now U.S. Pat. No. 7,260,820, which is wholly incorporated herein by reference.

BACKGROUND OF THE INVENTION

1. Field of the Invention

This invention relates very broadly to a computer system, and in particular to a system and related method of operation for controlling input and output (I/O) operations between at least one virtual machine and systems external to the virtual machine.

2. Description of the Related Art

Input/output (I/O) operations are among the most common carried out on modern computers. Some I/O operations are required simply for the efficient operation of the computer within the limits of the existing hardware and are performed substantially without user intervention, sometimes not as the result of any user action at all. For example, an operating system (OS) may need to swap data between a fast, volatile RAM memory and a hard disk simply because there is not enough RAM available for some immediate need.

Other I/O operations arise because of some user action. For example, when a user wants to send e-mail via a network, he may click on a "Send" icon in an e-mail application. Several I/O operations must take place in order to carry out this command. First, the displayed icon itself represents an output operation from the browser application, via the OS, a display driver, and a graphics card, to the monitor that the user is looking at. Second, sensing the position of the displayed cursor and the click of the input device (such as a button on a standard mouse) both involve inputs that are routed to the application via the appropriate driver in the OS. Third, in order to complete the "Send" operation, the OS must transfer the data (and associated transmission information) as an output operation to the driver of some device such as a modem or equivalent network connector, which then coordinates the actual transfer of the data out to the network.

Each I/O operation is a potential security weakness. A very common example of this would be destructive computer viruses: If users never needed their computers to be connected to any other computers, and never loaded data that came from any other source, and all their native software and hardware were certain not to have any viruses to begin with, then they would never need to worry about viruses. This would of course be the equivalent of living one's entire life in a sterile environment without any chance of contamination from the outside world. This is also of course impractical in all but very specialized cases.

Other problems of "security" have nothing to do with destruction of valuable data or damage to the computer's software itself. As many concerned parents have come to realize, the Internet makes readily available to the eyes and ears of curious children much material that even the most jaded adult would be far better off not seeing or hearing. As a result, many software packages are now available that attempt to filter the input from the Internet to the users' display screen and/or loudspeakers. Because such commercial network filters are applications loaded into the computer like any other, they can be defeated, often more easily by the computer-savvy children they are meant to protect than by the concerned parents.

Yet another frequent security concern involves the privacy of data transferred outside the computer (for example, over a network), or even within a single computer that has multiple users. The most common method for dealing with this is encryption. In conventional systems, some software package is installed in the computer that encrypts and decrypts the data before and after I/O operations. Once again, if the encryption routine is implemented purely as software that is at the same functional level as other applications, then it can be defeated or rendered non-functional. To minimize this weakness, some systems include specialized encryption hardware that resists software attack. Although generally more secure, the strength of this solution is also its weakness—the user must buy and install specialized hardware.

Other issues of I/O control have nothing to do with security as such. Companies that maintain frequently accessed general web sites, such as those for major news organizations, web-based e-mail systems, etc., agree to insert into their sites banners or other forms of displayed advertising that users see whenever they view the site. Of course, users are generally as keen to be rid of such irritating advertising clutter as the advertisers are to have it displayed. Accordingly, filtering software exists that tries to analyze the content of each particular web page and eliminate the advertisements.

From the perspective of the user, the ability to eliminate advertising banners may be a blessing, but in this and other cases it may be undesirable to allow the user to defeat such a display. For example, employers who have an internal company network may want to make sure that the company logo always appears on any display, or that a banner or tag such as "Company Confidential" always displays when an employee is viewing a screen that is displaying information from certain sensitive files such as the information in personnel files. Again, as in previous examples, any software application one might install to prevent the user from defeating the display itself could be defeated by a sufficiently skillful user, that is, one who knows enough about the system software, hardware and the application itself. Note that even supposedly "impenetrable" software has been defeated ("hacked") in recent years, often by users accessing the respective systems remotely, and often by "experts" who are so young that their parents have to drive them to their criminal trials.

SUMMARY OF THE INVENTION

The invention provides a method for controlling input/output (I/O) operations of a user's computer, as well as the hardware and software architecture to carry out the method. According to the invention, the user's computer in implemented as a virtual machine (VM). A virtual machine monitor (VMM) is also included as a VM-transparent interface between the VM and a physical computer system, which includes at least one device. The VMM includes software modules for sensing a request for an I/O operation between the VM and the device and for performing a predetermined transformation (which may optionally even be time-varying) of I/O data passing between the VM and the device. The I/O data may be of any type, including video (display) or audio data, network packets, data being written to or read from a disk, etc. The transformation of the I/O data is thereby made undefeatable by any user action via the VM.

In one embodiment of the invention, the device is a display and the I/O data is VM display data output from the VM and intended for display. In this case, the predetermined transformation is a replacement of at least a portion of the VM display data with non-defeatable display data stored external to the VM but accessible to the VMM, for example, in a display map/buffer located within the VMM. The data in the map/buffer is then used as the basis for the display such as that is visible to the user; the display will include the non-defeatable display data as an overlay.

Not all I/O data to or from the VM may always need to be transformed. Rather, the I/O data may be filtered with respect to at least one predetermined filtering condition and will be transformed only when the filtering condition is met. Many different filtering conditions may be used by the invention, depending on the type of I/O data and the device it is being sent to or input from. For example, the filtering condition may be that the I/O data includes at least one predetermined restricted term, or is from a predetermined restricted source.

According to one aspect of the invention, the I/O data may include image data. In this case, the step of filtering the I/O data comprises detecting the presence of a representation of a target image within the image data and the predetermined transformation is substitution of a representation of a replacement image in place of the representation of the target image. The I/O data may even be in a non-character image format, in which the target image is a representation of a restricted character string rather than an actual character string. In this case, character recognition may be used to convert the image to text, which may then be filtered by conventional parsing of the recognized text.

Another example of a filtering condition is the presence in the I/O data of a copy protection indication. It is also possible to use the invention to insert a source indication associated with the VM into the I/O data.

In other applications of the invention, the device is a network connection device. Again, many different types of transformations may be applied to I/O data between the VM and the network connection device. For example, the I/O data transfer, on either transmission or reception or both, may be subjected to bandwidth limiting, or may be delayed, or (on transmission) redirected to a different address.

Yet another I/O transformation that the invention may provide is encryption/decryption. For example, data that the VM writes to a physical memory disk can be encrypted, and then decrypted upon read operations to the VM.

In VMs that support a plurality of I/O modes (such as audio and video, or from a network to video, etc.) the invention may filter the I/O data with respect to a criterion relating to one of the modes but transform data expressed in a form corresponding to a different one of the I/O modes.

BRIEF DESCRIPTION OF THE DRAWINGS

FIG. 3 illustrates one example of how the invention may be used, in this case to generate a display overlay that cannot be removed by the user.

DETAILED DESCRIPTION

The main idea of this invention is a unique way to control the flow of information between a user's computer and all systems external to that computer. In the following description, the main hardware and software components of the invention are described. Then, the general method of operation according to the invention is discussed. Finally, several examples are given of how the invention can be used in different applications.

Main System Components

Figure 1:
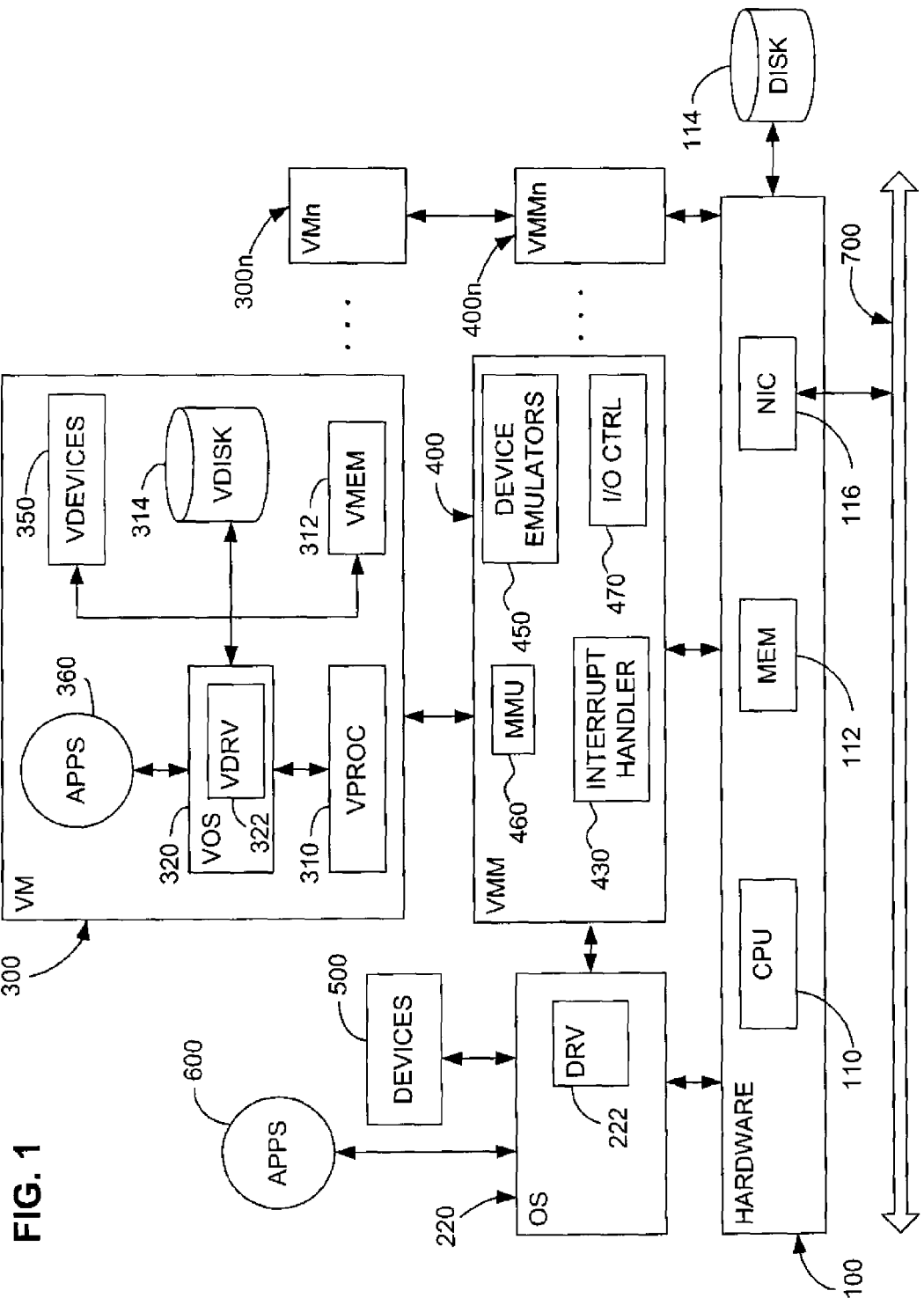
FIG. 1 is a block diagram that illustrates the main hardware and software components of the invention, including an I/O control module within a virtual machine monitor on which a virtual machine runs.

As FIG. 1 shows, the main components of a computer according to the invention include an underlying hardware platform 100, host system software 200, and at least one virtual computer (also commonly referred to as a "virtual machine") 300, ..., 300*n*. In the preferred embodiment of the invention, a virtual machine monitor (VMM) 400, 400*n* is also included for each virtual computer. These main components are discussed below.

System Hardware

The system hardware 100 includes a central processor CPU 110, which may be a single processor, or two or more cooperating processors, in a known multiprocessor arrangement. As in other known systems, the hardware includes, or is connected to, conventional registers, interrupt-handling circuitry, and other components as needed for normal operation of the system. These components are not shown or discussed further here since they are so well understood in the art of computer design. As in most computers, two different types of data storage devices are preferably provided: A relative fast system memory 112 (the machine memory), typically implemented using any of the various RAM technologies as part of the hardware platform 100, and a much slower but usually higher-capacity storage device such as one or more memory disks 114.

The system hardware will also include any components needed to enable connection to and data transfer with any external systems such as a network 700. For example, FIG. 1 shows the hardware platform as including a conventional network interface card (NIC), which is or acts as a modem or analogous network connector.

System Software

As in other known computers, the system according to the invention includes system software, which typically comprises an operating system (OS) 220. The OS will include drivers DRV 222 as needed for controlling, communicating with and scheduling various installed devices 500. These devices 500 will typically also include various conventional input/output devices such as a display monitor, a keyboard, some pointing or cursor control device such as a mouse, trackball, touchpad, etc., and possibly such peripherals as a printer, video and/or graphics card. No particular peripheral devices are required by the invention although some, such as a printer or display, will normally be included at least for administrative purposes. Note that the disk 114 itself may be considered to be an installed device in that read and write access to it is typically scheduled and handled by the OS substantially as for any other device. This is not required by the invention, however.

The OS also includes any other conventional software components (not shown) necessary to handle resource (such as I/O device, memory, etc.) allocation and scheduling for installed applications 600. One software component found in many operating systems is an application program interface (API); if such an interface is required for any application 600 loaded on the OS 220, then one will of course be included in any implementation of the invention. Because this invention does not presuppose any particular OS 220, and because the characteristics and functions of operating systems are so well know, the OS 220 is not discussed in greater detail below, except insofar as it cooperates with the components of the system unique to the invention.

Virtual Machines

In the preferred embodiment of the invention, at least one virtual computer 300, ..., 300n, usually referred to in computer science as a "virtual machine" (VM), is installed to run on the host. As is well known in the art, a VM is a software abstraction—a "virtualization"—of an actual physical computer system. As such, each VM 300 will typically include a virtual CPU 310 (VPROC), a virtual operating system 320 (VOS) (which may, but need not, simply be a copy of a conventional, commodity OS), virtual system memory 312 (VMEM), a virtual disk 314 (VDISK), virtual peripheral devices 350 (VDEVICES) and drivers 322 (VDRIVERS) for handling the virtual devices 350, all of which are implemented in software to emulate the corresponding components of an actual computer. Although the key components of only one VM 300 are illustrated in FIG. 1 and discussed below, the structure of any other VMs will be essentially identical.

Of course, most computers are intended to run various applications, and VMs are usually no exception. Consequently, by way of example, FIG. 1 illustrates a group of applications 360 (which may be a single application) installed to run at user level on the VOS 320; any number of applications, including none at all, may be loaded for running on the VOS, limited only by the requirements of the VM. If the VM is properly designed, then the applications (or the user of the applications) will not "know" that they are not running directly on "real" hardware. Of course, all of the applications and the components of the virtual machine 300 are instructions and data stored in memory, just as any other software. The concept, design and operation of virtual machines are well known in the field of computer science.

Virtual Machine Monitors

Some interface is usually required between a VM and the underlying "real" OS 220 (real in the sense of being either the native OS of the underlying physical computer, or the OS or other system-level software that handles actual I/O operations, takes faults and interrupts, etc.) and hardware, which are responsible for actually executing VM-issued instructions and transferring data to and from the actual, physical memory and storage devices 112, 114. This interface is often referred to as a virtual machine monitor (VMM). A VMM is usually a thin piece of software that runs directly on top of a host, or directly on the hardware, and virtualizes all, or at least some subset of, the resources of the machine. The interface exported to the respective VM is the same as the hardware interface of the machine, or at least of some predefined hardware platform, so that the virtual OS cannot determine the presence of the VMM. The VMM also usually tracks and either forwards (to the OS 220) or itself schedules and handles all requests by its VM for machine resources as well as various faults and interrupts. The general features of VMMs are known in the art and are therefore not discussed in detail here.

In FIG. 1, VMMs 400, ..., 400n, are shown, acting as interfaces for their respective attached VMs 300, ..., 300n. It would also be possible to include each VMM as part of its respective VM, that is, in each virtual system. Moreover, it would also be possible to use a single VMM to act as the interface to all VMs, although it will in many cases be more difficult to switch between the different contexts of the various VMs (for example, if different VMs use different virtual operating systems) than it is simply to include a separate VMM for each VM. The important point is simply that some well-defined, known interface should be provided between each virtual system 300, ..., 300n and the underlying system hardware 100 and software 220.

In some conventional systems, VMMs will run directly on the underlying system hardware 100, and will thus act as the "real" operating system for its associated VM. In other systems, the OS 220 is interposed as a software layer between VMMs and the hardware; still other arrangements are possible. This invention works with all such configurations, the only requirement being that I/O requests by any VM, and the returned results of the requests, should be able to be tracked and intercepted by some software component that performs the functions of the VMM described below.

In the following description of the invention, merely for the sake of simplicity, only one VM/VMM pair is discussed. The discussion applies equally, however, to all such VM/VMM pairs that may be included in any given implementation of the invention.

Interrupt Handling and Device Emulation

Both hardware and software components can issue I/O requests via the operating system (or whatever software handles such requests). Depending on the type of request and why it was issued, the requesting component can either enter a wait state or it can continue with other tasks until the request is fulfilled. In both cases, however, the requesting component needs to be notified when the I/O request has been completed. This is typically handled using interrupts: When the requested I/O has completed, the device that carried it out issues an interrupt, which is usually a signal to the processor. An interrupt handler, conventionally within the OS 220, then senses the interrupt, notifies the requesting component, and makes the results of the I/O operation available to that requesting component using a predetermined protocol.

In the context of this invention, whenever an application 360 or device 350 running on or via the VOS 320, or the VOS 320 itself, issues an I/O request, this request is intercepted and handled by the VMM. This is known in the art of virtual machine technology; indeed, this is a primary function of a VMM, almost by definition.

As FIG. 1 illustrates, the VMM 300 preferably includes an interrupt handler 430, which is a software component well known to computer scientists. Assume that the VM (in particular, the VOS 320) has issued a request for a page of memory from disk. The request will be addressed to the virtual disk VDISK 314, but the actual data will be stored on the physical disk 114—the VMM will, as in conventional systems, include an appropriate memory map and memory management unit 460 to handle translations between virtual and physical memory spaces, to perform memory tracing (if needed) on the memory allocated to the VM, etc. The VMM will then pass the request for the corresponding page of physical memory either to the OS 220 or will handle it itself in systems where the VMM itself directly manages the resource (here, the physical disk). Once the requested page has been transferred to a designated page in the system memory 112, an interrupt is raised by the disk driver to signal completion of the transfer.

The interrupt handler 430 in the VMM then intercepts this interrupt and maps the page of system memory to a corresponding page in virtual memory. The VMM then signals completion of the transfer to the VOS, in effect simulating another "interrupt" to the VOS. The VM then continues execution as normal. From the perspective of the VM, that is, of any user of any application running in the VM, all that will have happened is that a normal transfer from disk to memory will have occurred. In reality, however, the virtual transfer will correspond to a physical transfer, with the operations performed by the VMM (here, memory mapping and interrupt handling) remaining transparent to the VM.

In order to provide more generality, the VMM according to the invention may also includes device emulation modules 450. As the name implies, these modules are software interfaces between the VMM and the VOS 320 that emulate the characteristics of respective physical devices.

I/O Control

In this description, the operations controlled by the invention are referred to as "I/O". Note that the concepts of input and output depend on the perspective of two communicating components, so that even when all data flow controlled by the invention is input to the VM, it is still, simultaneously, an output from the device that completed the I/O operation requested by the VM; it would also be an output operation from the VMM, which forms the interface between the VM and the physical, non-virtual system. The same applies to applications of the invention in which the only data transformed is from the VM to some external device—such output from the VM would still be input to the external device. The term "I/O" is therefore not intended to limit the invention to use in transforming data that passes in only one direction, that is, either to or from the VM.

One module within the VMM according to the invention that is not found in the prior art is an I/O control module 470. Several examples of the function of this module are given below. The function can, however, be described generally as follows: Whenever the VM requests any of one or more predetermined I/O operations, then before the results are actually made available to the VM, they are transformed by the I/O control module 470, more specifically by a transformation module 474 and possibly only when a filtering module 478 detects that the I/O data satisfies some transformation-triggering criterion or condition (these modules are discussed below).

The invention is able to carry out many different types of transformations, on many different types of data. For example, where the I/O involves some visible presentation of the data, transformations might encompass deletions, insertions, and modifications of the presentation. Transformations may also be temporal: Where the I/O involves transfer of data between a VM and the network (or some other device that streams data), for example, the transformation applied may involve introducing transmission or reception delay or bandwidth limiting. Many other examples of transformations are given below.

The operation of the I/O control module can be activated within the VMM, for example, when the interrupt handler 430 signals that an I/O request has been completed. The transformation applied by the module 430 may also be "triggered" when the user takes certain predetermined actions, or when the data meets certain predetermined transformation or filtering criteria. This is explained further below.

The I/O control module 470 may transform not only data input to the VM as the result of a VM-generated request, but also data that is to be transferred (output) from the VM to a device or software routine that is external to the VM. The I/O control module 470 may also operate in a "streaming" mode, in which data passing to and/or from the VM via the VMM is transformed serially, such that the I/O control module does not need to wait for the entire results of the transfer to be available at once, but rather can operate on smaller I/O units, for example, pages, files, or even individual words or bytes or bits (for example, parity bits).

Figure 2:
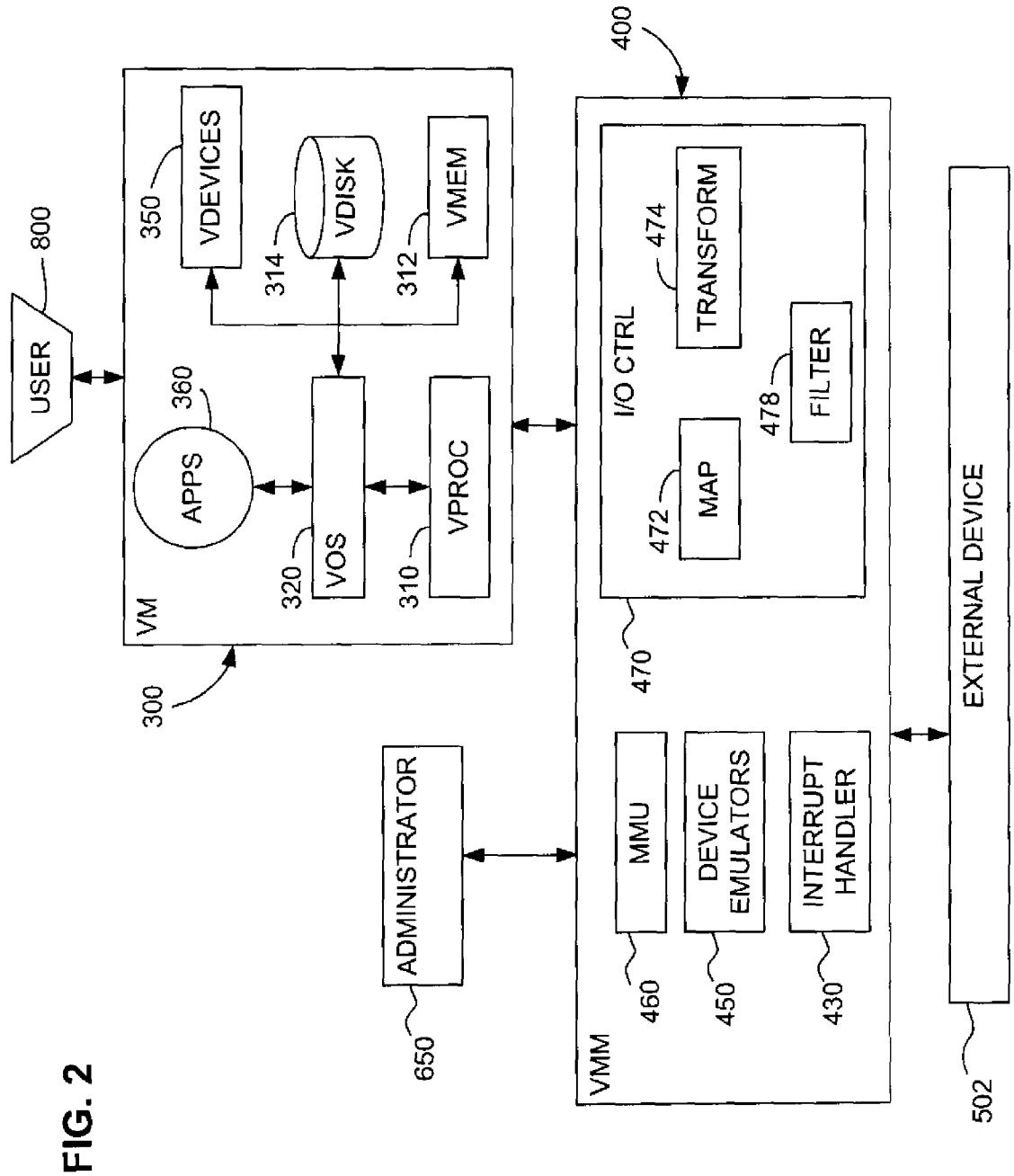
FIG. 2 is a block diagram that shows the main software components of the virtual machine monitor used in the preferred embodiment of the invention.

FIG. 2 shows the structure of the I/O control module 470 in greater detail. In FIG. 2, the OS 220 and various hardware components are not shown merely for the sake of simplicity—their presence can be assumed, and they will perform their normal functions. FIG. 2 also shows various components of the I/O control module 470 that are used by the invention when the VM issues an instruction that involves I/O with some device 502 that is external to the VM. This device 502 may be part of the system as a whole, for example, the physical disk 114, or a device that is accessible only via a network connection; the principles of operation of the invention are same in both cases.

The device 502 need not involve hardware; the only common concept in the context of this invention is that the device is some structure that is not within the VM, but with which the VM communicates via the VMM.

Data (which here can also be taken to include executable code, since it too is typically transferred in the same way as non-executable data) that is to be transferred to (or from) the VM as a result of an I/O request is stored in a memory space or module 472 referred to here as the "map" or "buffer" or "mask" depending on what type of information it is currently being used to store. For example, as is explained below in greater detail, this module may be a bit map used for a display, or it may be a buffer space where data transferred serially via a network is first assembled before it is transformed.

The data, or a sufficient part of it, that is passed to the VMM for forwarding to the requesting VM is preferably examined by a filter module 478, which applies one or more predetermined filtering conditions to decide whether the data is to be transformed or not; the filter 478 may be deleted if I/O data for the VM is always to be transformed—examples of when one might prefer this are given below.

An administrative system 650 (an application or even another computer system, which may even be another VM, and is under the control of a human administrator) may also be connected to the VMM either directly or, in most cases, via the OS 220 and whatever software is included (for example, a driver 222) used for communication between the OS and the VMM, in order to set the parameters of the I/O transformation applied by the I/O control module 470. Depending on the type of transformation to be applied, these parameters may include the filtering condition(s) mentioned above. FIG. 2 also illustrates a user 800 who is operating the VM.

Examples of Non-Defeatable I/O Transformations

In order to make the operation and structure of the invention more understandable, consider the following example. This example is also illustrated in FIG. 3, in which, for the sake of simplicity, other components of the system as a whole (which are shown in FIG. 1 or 2 or both) that are not needed for understanding of the example have been omitted, but can be assumed to be present and performing their normal functions. In FIG. 3, the I/O control module 470 is shown having as its main software components not only the display map 472, but also a transformation module 474 and a filter module 478.

Assume that the user is working with a standard spreadsheet application and wants to open a file containing sales data, which he wants to view on the screen 910 of a physical display monitor 900. Because the user is interacting directly only with the virtual computer 300, any data for display will be maintained in an allocated portion of the virtual memory 312.

The request for the file—represented graphically in FIG. 3 as a bar chart 480 stored within the physical disk 114—will pass as normal from the application to the VOS 320, which will then retrieve the corresponding disk blocks in its normal manner from the virtual disk 314. The retrieval of the data from the virtual disk is intercepted by the VMM, which performs the I/O operation on behalf of the VOS, and possibly transforms the data that is being read or written to during the I/O operation.

As in conventional virtual systems, the file (that is, the disk blocks associated with the requested file) may then be transferred as is into virtual memory for use by the application that requested it. A corresponding "real" display map—the one that is accessed by the display driver located in the OS 220—is, however, maintained in the VMM, or in some component that is accessible to the VMM, preferably in the I/O map/buffer space 472.

In this example of the invention, assume the file (associated disk blocks) is designated as being restricted, which may be determined by comparing the corresponding file, directory or drive name, or disk block identifiers, with a list maintained in the filter module. The transformation module will then generate and apply to the display map 472 an overlay in the form of a visual indication 920 such as a banner or tag that indicates access (successful or attempted) to the confidential file. In FIG. 3, the banner reads "CONFIDENTIAL FILE ACCESS." This can be done simply by writing the corresponding bits (or ASCII bytes, or whatever minimum display units are used) into the display map 472. As in conventional display data, color and effect information may also be part of the overlay, so that the banner could be, for example, always in red, or could blink, or could be some other dynamic, time-varying transformation such as an animated overlay, etc.

Filtering could also be performed based on the higher-level name of the file(s) to be transferred, assuming these names are visible to the VMM. In the case of a file read from a network server, for example, the filtering module could observe the NFS or SMB protocol messages, which may include file and server names, and direct the transformation module to perform the predetermined transformation on the I/O data any time the name of a requested file is on a target list, or not on a permitted list.

The banner or tag (such as "CONFIDENTIAL," or a company logo) may be placed within the graphical display of the virtual machine, as FIG. 3 illustrates. If the resolution of the display of the virtual machine is less than the capabilities of the real frame buffer, however, the transformation module could place the banner or tag outside the normal display of the virtual machine, for example, either below, above, on the right or the left of the virtual display.

The result of this transformation operation is that the banner or tag or other visible indication 920 will appear on the physical display regardless of what the user does—because the user's actions are restricted to the VM, he has no way to influence the actual display map 472 used to generate the physical display. In other words, the user 800 cannot defeat (prevent or undo or in any way affect) the transformation of the requested I/O operation even if he somehow were able to gain direct control of the VOS 320 and all other components of the VM: untransformed data is simply never available for access by the physical display driver because the VMM is transparent to the VM.

In order to make the transformation completely transparent to the VM, the original, untransformed display data may be allowed to be stored as is in the VM frame (display, audio, etc.) buffer. It would also be possible, however, to transform even this data before storing it in the VM frame buffer. If this is done, and especially if no copy of the "raw" data is stored within the VMM or in any other buffer, then there will no copy of the raw data stored anywhere in the entire system.

In FIG. 3, the display 900 is shown as rendering the bar chart, that is, the requested file, along with the banner 920. This is not necessary. Instead, the banner could be displayed regardless of the current display merely to indicate that the user has, or has attempted to, input a restricted file. The requested information itself could be displayed or not depending on the user's access privileges.

Moreover, just because data may be intended primarily for display, it is not necessary that the transformation be limited to the display data. Instead, or in addition, the banner (or other notice), could be inserted into, for example, buffered print data, so that it would appear on any print-out. In this case, the transformation could be applied to data used for presentation via two different external devices—a display and a printer.

It would also be possible for the overlay to be translucent, letting through the original display data with different levels of visibility. For example, if the original text is mostly visible (very translucent overlay), then the overlay will take more the appearance of a watermark. Allowing the overlay to mostly obscure the original display data, however, will have the effect of calling the attention of the user to the transformation, while still letting him see what caused it. The way in which a translucent overlay is created is well known in the art of computer graphics and involves "interspersing" in the display map the bits of the overlay with those of the original data.

Using the invention to combine original I/O content with a translucent overlay is not restricted to on-screen displays. For example, as is mentioned briefly above, whenever a user prints a document, the transformation module may be set to generate a watermark and incorporate it into the data in the printer's buffer. This watermark may be made very weak and difficult to detect. If the watermark is applied only to data to be printed that has predetermined characteristics, or comes from specific sources, then this watermark would be able to function as a non-defeatable indication of copying. Instead of a translucent overlay, the non-defeatable indication could also be some predetermined but hard-to-see mark placed somewhere in the print frame. These techniques are sometimes referred to as "copyright traps" since they provide all but irrefutable evidence that the data being printed was not generated originally by the VM user. The advantage of using the invention to accomplish this, though, is that even if the VM user knew of the nature of the trap, he would still not be able to prevent it from being generated and printed.

The operation of inserting hard-to-detect markings within the I/O data may also be extended to data created by (if this can be determined) or at least passed from the VM. For example, the transformation module could insert some source indication, such as a predetermined bit pattern or alteration into the I/O data sent from the VM via the VMM for forwarding to a device such as a printer. This would then serve as irrefutable evidence that the VM had at one time accessed the data. Care must be taken, of course to avoid introducing check-sum or parity errors in the I/O data in cases where such techniques are used for error detection by the recipient device.

The filtering module could also be programmed to detect the presence of such a copy-protection indication within I/O data. Such indications are already being included, for example, as part of the protocol of digital audio and video transmission formats. If the filter module detects the presence of the copy-protection indication in the I/O data, then the transformation applied by the VMM could be, for example, the forwarding of an error message to the VM instead of the expected data, including replacement of the entire set of I/O data by the error message.

This concept of undefeatable copyright traps can also be extended to other modes, such as audio. Thus, for example, into the stream of every audio file downloaded from the network with some predetermined file extension (such as .mp3), or into the buffered downloaded data, the transformation module could insert or overlay some predetermined bit pattern (audio mark) that would identify the file as having been obtained via downloading. The filter module could in this example also be provided with a list of approved domains (for example, ones from which the owner has bought a license) from which, say, mp3 files may be downloaded without triggering the generation of the mark.

Filtering

It is of course possible that only certain data to be displayed needs to be marked with the non-defeatable banner 920. In these cases, the VMM could, for example, use conventional memory tracing to mark those portions of disk storage that contain company confidential material. Any transfer of data from a marked portion could then be used as a trigger for the transformation module 474. In this case, the filter condition would be the requested transfer of any such marked data to the display map.

It is not necessary, however, to apply any filtering at all; rather, all displays generated by the VM could be transformed so as to include a non-defeatable banner 920. For example, the transformation could be an overlay of, for example, a company's logo or an advertisement. In such case, the filtering condition would be simply that any data is present in the display map 472 used by the physical display 900.

To consider another example of a use of the invention, assume that the external device 502 is a network interface connected to the Internet. The Internet would thus replace the disk 114 in FIG. 3, and the application the user 800 is using will typically be a browser. Here, display transformation can be either conditional or unconditional, or both, depending on content.

In the simplest case, all displays generated by the browser could be transformed by setting the transformation module 474 to add as a display overlay a non-defeatable banner advertisement. One reason the user might even willingly tolerate this would be if, for example, the manufacturer of the system as a whole were to sell it to the user at an attractively low price, but only on the condition that he accept the transformed displays.

Note that because a VM, by definition, acts precisely as a "real" computer, it might not even be necessary for the user ever to know that the computer on which he has loaded his applications is entirely virtual. This transparent operation is, in fact, more common than one might suppose: Few users of the widespread Microsoft Windows 98 operating system realize, for example, that some of the older applications they may choose to run are actually executed using a virtual machine intended to accommodate the appropriate legacy operating system or the outdated 80386 Intel processor.

In the examples given above, a visible overlay is added to the display map, either always or only if some condition is met. It would also be possible for the "overlay" to consist wholly or partially of some "null" value, whereby one or more portions of the display are masked out, that is, simply not displayed. This, too, could be either conditional or unconditional. For example, assume that one determines that banner advertisements are typically located in a 3 cm horizontal strip whose top edge is 4 cm from the top of the screen displayed by a web browser, just under the toolbars. The transformation module 474 would then mask out the 3 cm strip, for example by setting the corresponding bits in the display map to "black."

Banner advertisements that include text are usually generated from code, for example, in HTML, XML, or some equivalent, that can be parsed. This means that the filtering module 478, using well-known programming techniques, could examine the HTML (for example) code in order to detect the presence of predetermined text and either delete or replace only that text. For example, assume that the "raw" current HTML code includes, in a banner, the term "Brand X." The transformation module could then either delete "Brand X" and allow the rest of the banner to display, or it could replace this text with something else, for example, "Brand Y", or a warning against Brand X.

The invention is not restricted to filtering and transforming displays based on parsed text in underlying source code. It would, for example, also be possible for the filtering module to operate directly on raw pixel data, that is, the bit (or vector, etc.) data in the display map 472, and thereby to transform images as well. Assume, for example, that the administrator of the system (or whoever programs the filter and transformation modules) wishes to prevent users from viewing certain target images, such as a predetermined logo or symbol (such as a swastika). The filtering module 478 would then include a representation or characterization of the target image. The pixel pattern stored in the display map would then be scanned and analyzed using any conventional algorithm to determine the presence and location of the target image. If the filtering module detects the presence of the target image, then the transformation module replaces it with some other predetermined image, which may be a simple pattern of black pixels or even a complex replacement logo or symbol.

Note that text may in many cases also be represented as a non-ASCII image, for example, where a document has been downloaded in an image format such as pdf, gif, or jpg. In this case, the presence of target text could be determined by applying a known optical character recognition (OCR) algorithm to the pixel set in the display map and parsing (if necessary) the converted image.

Regardless of how the presence of a target image is detected, once found, the transformation module would then be invoked to transform the display in any appropriate way. The target image could be blacked out, for example, or replaced with some other image, or covered with a banner. The I/O control module 470 could then also (or instead) send a message, for example, to the administrator or via the network to some other party, giving notice that the user had downloaded or attempted to view or actually viewed the target image.

The pixel (display) map may also be filtered and transformed based on target characteristics other than the content of some specified image or text. One of the many alternative characteristics that may be used to trigger transformation would be the color of some portion of the display. If, for example, a user suffers from the common red-green color blindness, then the filter and transformation modules could be set to identify all on-screen display portions that are to be displayed with one of the hard-to-see colors. Colors may, for example, be identified by their red-green-blue (RGB) or cyan-magenta-yellow (CMY) percentages, Pantone numbers, etc. If both red and green are found, or found too near each other, then the color one or both of the corresponding display portions could be adjusted for greater visibility, for example, by replacing them with a different color.

Another example of a transformation that has nothing to do with any prohibited terms or images, but rather simply with a characteristic of text, could be a change in the font or size of text. This could be determined either by parsing the HTML/XML code (with the filter module acting as a network filter) or by using OCR on the display map. Text that is in a font too small or too unclear for the user to see clearly could then be automatically converted for display into a more desirable font, assuming there is enough room on the display.

It is not necessary for the display map 472 to be wholly or even partially a bit-mapped or vector display representation; rather, in some applications, it may act as a simple buffer that stores symbolic (for example, ASCII) information that is converted for display by some other module, for example the display driver. This symbolic information can then be parsed and transformed as described above.

The filter module is not restricted to operating on data used directly for display, such as a bit map. Instead, acting as a network filter, it may instead operate on some other stream of code or data that is used to generate the display. One example of this would be an HTML or XML stream sent to a browser. In this case, the contents of the stream can be parsed by conventional code within the filter module 478. If the filter module detects one or more words from a pre-stored list (entered, for example, by the administrator), then the transformation module could remove from the stream the word(s), or the sentence or paragraph containing the prohibited words, or all text within some predetermined distance (for example, 2 cm above and below) of the word(s). The invention would in this implementation be performing the same function as a conventional network filter, for example, to protect children from pornography. The difference, however, is that there is no way for even the most computer-savvy teenager to override the filtering operation, because he is isolated within a virtual computing environment and the filtering and transformation code is not within the VM.

Transformation could also be based on the I/O source instead of, or in addition to, the I/O content. In this case, the filtering module 478 could contain a list of restricted sources (for example, e-mail addresses and/or URL's, or disk drives or memory partitions), or a list of permissible sources. Any information coming from a source on the restricted list, or not on the permissible list, could be "transformed," for example, by having the entire display "blacked out", along with a banner notice as to why.

This embodiment may thus also be used to perform the function of an existing network content filter. Unlike conventional filters, however, the invention allows for a feature that is not available in the prior art, namely, the non-defeatable transformation. Instead, a non-defeatable message could be inserted into the display map alerting the user to the fact that input from an unauthorized source was attempted. Moreover, using the invention, there is no need to install any special filtering software within the VM itself; indeed, the invention can operate without any modification to the VM at all.

Yet another transformation criterion may be not the source but rather the destination of network traffic from the VM. For example, if the VM attempts to send data to a network location (for example, a URL) on a restricted list maintained within the filtering module, then the transformation module could redirect the transmission to some other destination simply by inserting the substitute address into the transmission at the proper place, which can determined by and will depend on what network protocol is used. One example of when this might be useful is in systems where high-speed network routers are implemented in parallel to a standard network. The invention would then automatically redirect VM network content to the high-speed network routing system.

The invention is not restricted to transforming the contents of the display map (or other buffered I/O information) based on what is coming in to the VM, but may also be used to transform information being output from the VM in a way that cannot be overridden by the user. Assume, for example, that the user attempts to send an e-mail message to a recipient either not on an authorized list (for example, on an authorized server), or to a recipient on a "blocked" or "forbidden" list, or with a message containing a forbidden term. Using the invention, the filter module would examine the address of the intended recipient and/or the content of the message, and if it is not permitted, could either "transform" the address (or terms) by deleting it completely, thus blocking the "send" operation altogether, or it could redirect the address, with or without transforming the content as well, to some other recipient, for example, a parent's computer, or a security department.

This possibility is not restricted to the elimination of pornography. Rather, as another example, this aspect of the invention could be used to prevent inadvertent display or disclosure of the secret internal name of a project—even if the user typed the name, it would not be displayed, or printed, or output to the network.

The VMM, via the transformation module, could also prevent all files or messages containing specified restricted terms, or coming from predetermined sites or files or disk drives, from being written to any other memory device or region, or printed. In this case, after filtering, the applied transformation is a marking of the data in such a way that the VMM will not allow it to be rewritten or even printed. Thus, e-mail messages or data files could be converted into a "FOR YOUR EYES ONLY" format (which itself can be displayed as a tag for the user to see) that cannot be defeated by any user action because it is taking place outside of the virtualized environment to which the user is restricted. As in other cases, this can be done without installing any specialized software in the VM, and without modifying any software already running in the VM.

The invention may also be used to place a non-defeatable notice on a display, or in a printer buffer, etc., whenever predetermined filtering conditions are met, such that the notice can be turned off or otherwise removed only by the action of someone other than the user of the VM, for example, the administrator. Just a few of the examples of when this feature might be advantageous include when the user has attempted to access a forbidden site (for example, outside an employer's domain), or has attempted to access a disk file that he is unauthorized to access (for example, the personal information about company employees, or information with a security classification above that for which the user is cleared), or has attempted to download or read in data from a site or file that contains a prohibited term, or has tried to print a file containing a prohibited term, or has tried without authorization to copy a file from the virtual disk onto a portable memory device such as a floppy disk.

In all of these cases, once they have been detected by the filtering module, the transformation module can place a tag or similar notice on the display associated with the user's VM, or in a printer buffer of a printer, etc., as appropriate, that cannot be removed by any action on the part of the user. The type of notice will depend on the situation, of course, and could include such phrases as "UNAUTHORIZED ACCESS ATTEMPT" or "UNAUTHORIZED OPERATION" or "SECURITY VIOLATION", etc. Alternatively, a banner such as "SECURE" could be displayed on the screen until the user attempts some unauthorized I/O operation, at which time the transformation module removes the banner from the display.

If the filter module 478 includes conventional virus-detection software, then the filtering condition that triggers a display transformation could be that a virus is detected in some incoming or even outgoing data stream or file. The transformation module can then place a notice such as "VIRUS WARNING" on the display, and the VMM can automatically isolate the corresponding file in the buffer 472 until the user or administrator takes some predetermined measures to prevent infection. Of course, existing virus-protection software also displays a notice concerning detected viruses. Unlike this conventional software, however, the invention does not require the software to be loaded into the computer (here, the VM) that requested infected I/O data. Moreover, the invention can automatically check outgoing files, so that the VM would not be able to spread viruses further regardless of what the user does or neglects to do.

The invention can thus be used to implement a firewall that requires no specific hardware support, yet completely isolates every VM from every system outside the respective VM itself other than its associated VMM. This firewall is, moreover, completely unalterable and impenetrable by the user, since it lies outside the virtual computing environment to which the user is restricted.

The transformation module may also include several different non-defeatable banners or notices or filtering, in any combination. For example, files or network addresses (including internal) could be classified into different security levels, for example, "CONFIDENTIAL", "SECRET", and "TOP SECRET", depending on their contents and/or which source the data comes from. As long as the VMM, the system hardware and software, and the administrator, have the highest security level, users with different clearance levels could then use the same system, but different VM/VMM pairs, and could be completely prevented from accessing data at a level above their clearances. The administrator can then set transformation modules 474 of each VMM to generate the appropriate security banner. In addition to preventing access, the VMM could also send a notice to the administrator any time a user attempts I/O of information for which he is not cleared.

One particularly advantageous form of transformation is encryption. In this case, before any data is transmitted from the VM to a physical device, whether internal (such as the disk 114) or external (such as via the network 700), it can first be encrypted by the transformation module using any known method. Note that the user himself need not even know the encryption routine or keys. Incoming data to the VM can then be decrypted and further filtered and transformed as desired before it is passed to the requesting VM. The encryption routine and keys can be set, for example, by the administrator, who has access to the VMM. If all members of a project worked only via respective VM/VMM pairs, with each VMM having the transformation module 474, then all (or certain predetermined) I/O to and from the users could be encrypted in a way that is completely transparent and inaccessible to the users.

One especially interesting use of transparent cryptological transformation according to the invention is when the physical device is the disk 114. If, as before, the transformation module encrypts all data that the VM writes to the disk (that is, the portion of the physical disk 114 on that contains the virtual disk 314), and decrypts all data read into virtual 312 memory by the VM from the disk, then no unencrypted data associated with that VM will ever reside on the disk 114. Indeed, one could physically remove the entire physical disk 114 but still not be able to access any VM-related data without knowing the proper keys.

One other example of the benefits of cryptological transformation using is where Ethernet packets are encrypted/decrypted during transfers between the VM and a network. As before, any known encryption mechanism, such as IPSEC, may be applied by the transformation module. Once again, the encryption would be completely transparent to the VM user.

Similar to a cryptological transformation would be the transformation of compression. Accordingly, the transformation module could apply any known algorithm to compress all data to and from disk, or the network connector, and to decompress the data before its transfer to a requesting VM.

The transformation implemented by the invention need not involve any form of visible display. Encryption/decryption is one example of this. As one other example, the transformation module 474 may be programmed, using conventional techniques, to act as a network bandwidth limiter or network traffic shaper, for example, in order to allocate network bandwidth to different VMs. For example, each VMM could limit its respective VM to a predetermined maximum bandwidth such as 1 MB/s; all I/O requests requiring more than 1 MB/s of bandwidth could then be limited simply by having the transformation module 474 drop packets that exceed the 1 MB/s bandwidth limit. Different VMMs could also cooperate in such as way as to dynamically adjust the bandwidth allocation for different VMs as a function of current availability.

The invention is well-suited for performing even other types of I/O transformations relating to I/O with a network. The function of network shaping is one example of a performance-based transformation. Another would be a transformation that deliberately imposed extra delay (latency) in an I/O operation. This type of transformation might be useful, for example, for testing systems. For example, the invention could then be used to simulate a lossy network connection by artificially dropping or causing bit errors in packets, or to simulate contention by delaying packets with some statistical distribution of delays. The delay may be introduced both in transmission of data from the VM to the network connection device and reception of data by the VM from the network connection device.

As another example, the invention may be used to transform audio data, in which case the external device 502 would be a sound card used to drive speakers. For example, assume that a video conferencing or telephone application is running on the user's VM. The transformation module 474 could then encrypt the audio output data. Incoming audio data could then be transformed by being decrypted before forwarding it to the VM.

Instead of (or in addition to) encryption, the transformation module 474 could also automatically change the sound characteristics by applying standard filters, for example, to remove high-frequency components, to attenuate the volume of selected audio, and reduce the require transmission bandwidth. Similar to the manner in which the transformation module can insert visible banners into a display, it would also be possible for it to insert, or substitute, audio content into an audio buffer or stream. For example, the transformation module could insert audio advertisements, or reminder or warning messages.

The invention may also be used to perform multi-modal transformations, that is, a transformation of one I/O feature as a function of another. For example, the transformation in which one text string in a display is replaced by another; thus, a visible portion of the display (a visual mode) is replaced another portion of the display (still, the visual mode). As just one example of mixed modes, if the filter module detects the presence of some predetermined text string intended for display, then the transformation module could generate an audio signal in response. Thus, if "Brand X" is in the string, the transformation module could place in the buffer of a sound card prestored data that would cause an audible message such as "Have you ever tried Brand Y?" As another example, a parent's audible reprimand could be played whenever a child attempts to download files containing objectionable material (filtering of input) or to send e-mail or type text that contains objectionable terms (filtering of output).

In most of the examples of uses of the invention given above, the condition that triggers a transformation of I/O data is that the I/O data contains some characteristic, such as some prohibited text string, or comes from some prohibited source. The transformation-triggering filter condition might, however, just as well be the absence of some required text string (or file extension, etc.) or that the source is not one of a set of approved sources. It will in many cases be easier to maintain a list of what is required rather than a list of what is prohibited.

In most of the examples of I/O transformation given above, "transformation" is used in the strict sense of the word, namely, a change of some data being transferred between the VM and some external device. It is to be understood, however, that in the context of the invention, it is not necessary for the VM to be the component that generates the I/O data, or even requests it; rather, an insertion of data into existing I/O initiated by some other component, for example, the administrative system 650 is also a kind of transformation.

For example, assume that one or more VM users are viewing respective display screens. The administrator, using conventional techniques, could then communicate with each (or selected) respective VMM by sending an appropriate command in order to direct its transformation module to insert into the corresponding VMs (user's) display map (or other I/O buffer) within the VMM some message, such as a banner. One example of such a message could be a notice of an impending shut-off of the system and a reminder to the users to save their work. Another example, useful in secure environments about to receive non-cleared visitors, could be that the administrator could direct each transformation module to black out all display screens except for a banner such as "NON-CLEARED VISITOR IN AREA—PLEASE STAND BY," perhaps with some other display feature such as a flashing red symbol. This would absolutely prevent the uncleared visitor from being able to see, even inadvertently, sensitive on-screen information, even if a project member happened to be away from his work station or carelessly left a door open.

Note that this administrator-initiated display transformation (securing of the display) can be done for any or all users, but will require no additional hardware support and no changes to any software of the VM. Moreover, assuming that the user does not need to see the display while it is secured, the display transformation (here, being blacked out) could be done while the VM continues execution of whatever code is was executing before the transformation.

One general advantage of the invention that is mentioned above is that it is preferably implemented in a way that is completely transparent to the user. Another general advantage illustrated by many of the examples given above is that the invention can accomplish a very wide range of transformations on almost all types of I/O with no need for specific hardware support at all, and with no need to install or modify any software in the VM or, for that matter, anywhere other than in the VMM.

What is claimed is:

1. A non-transitory medium embodying a computer program, the computer program controlling input/output (I/O) operations of a user's computer, the user's computer being implemented as a virtual machine (VM) in a physical computer system, the physical computer system including at least one device, the computer program comprising:
an interface software component interfacing with the VM and the physical computer system, the interface software component causing a central processing unit (CPU) of the physical computer system to perform the following operations:
sensing a request for an I/O operation between the VM and the device; and
performing a transformation of I/O data passing between the VM and the device, said transformation changing contents of the I/O data and being adjunct to complete servicing of the request, as issued, for the I/O operation;
the transformation of the I/O data thereby being undefeatable by any user action via the VM.

2. The non-transitory medium of claim 1, in which:
the device is a display;
the I/O data is VM display data output from the VM and intended for display; and
the transformation is a replacement of at least a portion of the VM display data with display data stored external to the VM;
wherein the computer program further causes the CPU to display the VM display data with the non-defeatable display data overlaid.

3. The non-transitory medium of claim 1, wherein the interface software component further performs the following steps:
filtering the I/O data with respect to at least one predetermined filtering condition; and
performing the transformation of the I/O data only when the filtering condition is met.

4. The non-transitory medium of claim 3, wherein the filtering condition is that the I/O data includes at least one restricted term.

5. The non-transitory medium of claim 3, wherein the filtering condition is that the I/O data is from a restricted source.

6. The non-transitory medium of claim 3, wherein:
the I/O data includes image data;
the step of filtering the I/O data comprises detecting the presence of a representation of a target image within the image data; and
the transformation is substitution of a representation of a replacement image in place of the representation of the target image.

7. The non-transitory medium of claim 6, wherein:
the I/O data is in a non-character image format;
the target image is a representation of a restricted character string; and
the step of filtering the I/O data comprises applying character recognition to the I/O data.

8. The non-transitory medium of claim 3, wherein the filtering condition is the presence in the I/O data of a copy protection indication.

9. The non-transitory medium of claim 1, wherein the transformation comprises insertion into the I/O data of a source indication associated with the VM.

10. The non-transitory medium of claim 1, wherein the transformation is time-varying.

11. The non-transitory medium of claim 1, wherein the device is a network connection device.

12. The non-transitory medium of claim 11, wherein the transformation is a bandwidth limiting of the I/O data being transferred between the VM and the network connection device.

13. The non-transitory medium of 11, wherein:
the requested I/O operation is a transfer of the I/O data between the VM and the network connection device; and
the transformation is a time delay of the transfer.

14. The non-transitory medium of claim 11, wherein:
the requested I/O operation is a transfer of the I/O data from the VM to a first destination address via the network connection device;

the transformation is a redirection of the I/O data to a second destination address different from the first.

15. The non-transitory medium of claim 1, wherein:
the device is a display;
the display renders data stored in a display map; and
the step of performing the transformation comprises altering a selected portion of the display map.

16. The non-transitory medium of claim 15, wherein the altering of the selected portion of the display data comprises substituting non-defeatable display data for the selected portion.

17. The non-transitory medium of claim 15, wherein the altering of the selected portion of the display data comprises changing all occurrences in the display map of a display color to a replacement color.

18. The tangible medium of claim 1, wherein:
the device is a data storage device;
the requested I/O operation is a transfer of data between the VM and the storage device; and
the transformation comprises changing at least a portion of the data during the transfer between the VM and the storage device.

19. The non-transitory medium of claim 18, wherein the transformation comprises encrypting data written by the VM to the data storage device and decrypting data read from the data storage device by the VM.

20. The non-transitory medium of claim 18, wherein the transformation of the I/O data comprises compressing data written by the VM to the data storage device and decompressing data read from the data storage device by the VM.

21. The non-transitory medium of claim 1, wherein:
the device is a network connection device;
the requested I/O operation is a transfer of data between the VM and the network connection device; and
the transformation comprises changing at least a portion of the I/O data during the transfer between the VM and the network connection device.

22. The non-transitory medium of claim 21, wherein the transformation of the I/O data comprises encrypting data written by the VM to the network connection device and decrypting data read from the network connection device by the VM.

23. The non-transitory medium of claim 21, wherein the transformation of the I/O data comprises compressing data written by the VM to the network connection device and decompressing data read from the network connection device by the VM.

24. The non-transitory medium of claim 1, wherein the transformation of the I/O data comprises cryptographic transformation of the I/O data.

25. The non-transitory medium of claim 1, wherein:
the VM supports a plurality of I/O modes;
the interface software component further performs a step of filtering the I/O data with respect to at least one predetermined filtering condition, the interface software component performing the transformation of the I/O data only when the filtering condition is met;
the step of filtering is performed on I/O data corresponding to a first one of the plurality of I/O modes; and
the predetermined transformation is applied to I/O data in a second one of the I/O modes when the I/O data in the first I/O mode satisfies a transformation-triggering criterion.

26. The non-transitory medium of claim 25, wherein the I/O modes include a video mode and an audio mode.

27. A non-transitory medium embodying a computer program, the computer program controlling input/output (I/O) of a user's computer, the user's computer being implemented as a virtual machine (VM) in a physical computer system, the physical computer system including at least one device that carries out an I/O operation on the basis of device control data, the computer program causing a central processing unit (CPU) of a physical computer system to perform the following steps:
loading an interface software component that interfaces with the VM and the physical computer system;
storing the device control data associated with the VM in a buffer; and
upon sensing a transformation command from an administrative system external to the VM, causing the interface software component to change contents of the device control data by entering replacement data into at least a portion of the buffer, said replacement data being entered as a processing step that is adjunct to completion of the I/O operation, the entry of the replacement data thereby being undefeatable by any action initiated via the VM.

28. The non-transitory medium of claim 27, in which the device is a display and the device control data is VM display data.

29. The non-transitory medium of claim 28, further comprising:
the buffer is a display buffer for storing the VM display data that is output from the VM and is intended for display; and
the replacement data comprises arbitrary data written to the display buffer;
in which the display is provided for displaying the contents of the display buffer.

30. The non-transitory medium of claim 27, wherein:
the device is a data storage device;
the I/O operation is a transfer of data between the VM and the storage device; and
the replacement data comprises a cryptographic transformation of data written by the VM to the data storage device and of data read from the data storage device by the VM.

31. The non-transitory medium of claim 27, wherein:
the device is a data storage device;
the I/O operation is a transfer of data between the VM and the storage device; and
the replacement data comprises a compression of data written by the VM to the data storage device and an expansion of data read from the data storage device by the VM.

32. The non-transitory medium of claim 27, in which the device is a network connection device;
the I/O operation is a transfer of data between the VM and the network connection device; and
the replacement data comprises a cryptographic transformation of data written by the VM to the network connection device and of data read from the data storage device by the VM.

* * * * *